May 22, 1962 P. PROFOS 3,036,000
METHOD AND MEANS FOR PURIFYING BOILER FEED WATER
Original Filed May 7, 1953
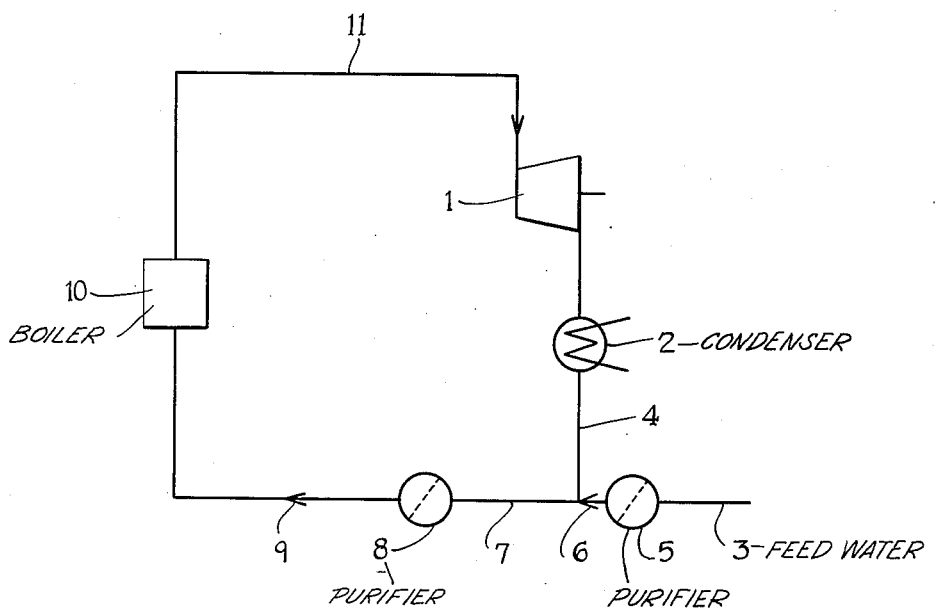
INVENTOR.
PAUL PROFOS.
BY K.B. Mayr
ATTORNEY.

United States Patent Office 3,036,000
Patented May 22, 1962

3,036,000
METHOD AND MEANS FOR PURIFYING
BOILER FEED WATER
Paul Profos, Winterthur, Switzerland, assignor to Sulzer Freres, S.A., Winterthur, Switzerland, a corporation of Switzerland
Continuation of application Ser. No. 353,483, May 7, 1953. This application Sept. 24, 1956, Ser. No. 611,732
Claims priority, application Switzerland May 8, 1952
1 Claim. (Cl. 210—30)

The present invention relates to a system for purifying the boiler feed water in steam power plants.

The application is a continuation of my application Serial No. 353,483, filed May 7, 1953, and now abandoned.

An always satisfactory purification of boiler feed water is the indispensible prerequisite for the operation of most steam generating plants. The more the boiler pressure is raised the more important is the purity of the feed water. Therefore, for example in power plants, purifying systems are often used, in which the boiler feed water is practically completely freed from harmful salts. Particularly in steam plants, in which the steam is used for other purposes than for the generation of power and in which the condensate is recovered wholly or partly for feeding the boilers, the condensate is freed in a purifying plant from all harmful salts, which may originate from leakages of the condenser. The operation of such plants requires particular care because overloading of the desalting devices, for example, in the event of ineffectiveness of the ion exchange masses owing to their exhaustion or other disturbances, can cause very dangerous damage in the boiler plants and the parts and machines connected thereto.

These dangers can be avoided by the use of the method according to the invention, in which the additional feed water, after it has been totally desalted in a special desalting plant, is additionally treated in the plant for totally desalting the return condensate. In such an arrangement of the desalting plant the danger of a possible entry of insufficiently purified water into the boiler is greatly diminished. In addition, the harmful effect of overloading the plant for desalting the make-up feed water is avoided, because, even if its ion exchange mass is completely exhausted, the desalting plant for the return condensate situated ahead of the boiler with respect to the flow of the water can still protect the boiler. It is preferable to work the desalting plant for purifying the additional feed water up to complete exhaustion and to periodically regenerate the desalting plant for the return condensate which serves as a protecting device for the purified feed water before its ion exchange mass is exhausted.

Further features of the invention can be seen from the following description and also from the drawing, in which an embodiment of the invention is diagrammatically illustrated. In this embodiment the condensate coming from a turbine as well as the additional fresh water are completely desalted in two total desalting plants arranged in series upstream of a steam generator.

Referring to the single FIGURE of the drawing, a boiler 10 supplies steam to a turbine 1 through a pipe 11. The steam is condensed in a condenser 2, the condensate flowing through conduits 4 and 7 to a total desalting plant 8, in which harmful salts are deposited, which can originate, for example, from cooling water leaking into the condenser. The desalted return condensate is fed into the boiler 10 through a conduit 9. The additional feed water, which serves for replacing the unavoidable water losses, flows through a conduit 3 into a total desalting plant 5 and therefrom into the condensate circuit through a conduit 6 at a point between the condenser 2 and the desalting plant 8, so that the purified additional feed water must additionally pass through the desalting plant 8. This serial connection of the desalting plants causes the desalting plant arranged immediately ahead of the boiler to act as a protective desalting device for the additional feed water delivered to the condensate circuit and totally desalted in another desalting plant. Thus, not only any salt and water penetration into the condenser, but also interruption of the operation of the desalting plant for the additional feed water are rendered harmless.

In addition to the return condensates from prime movers, other condensates can be used as boiler feed water, as are obtained in large quantities by heating or cooling in many chemical processes. If these condensates are contaminated, they are preferably conducted into the supply conduit for the additional feed water.

What is claimed is:

The method of purifying boiler feed water including totally desalting fresh water in a first ion exchange total desalting apparatus, totally desalting condensate in a second ion exchange total desalting apparatus, mixing the desalted fresh water with the condensate prior to desalting in said second desalting apparatus, working the first desalting apparatus to exhaustion before regenerating the first desalting apparatus, and regularly periodically regenerating the second desalting apparatus before it is exhausted.

References Cited in the file of this patent

UNITED STATES PATENTS

| | | |
|---|---|---|
| 1,895,635 | McDonald | Jan. 31, 1933 |
| 1,910,979 | Applebaum | May 23, 1933 |
| 2,330,865 | Butzler | Oct. 5, 1943 |
| 2,743,583 | Bayard | May 1, 1956 |
| 2,798,359 | Foster et al. | July 9, 1957 |

FOREIGN PATENTS

| | | |
|---|---|---|
| 641,440 | Germany | Feb. 1, 1937 |
| 722,688 | Great Britain | Mar. 15, 1953 |

OTHER REFERENCES

"Finding and Stopping Waste in Modern Boiler Rooms," Cochrane Corporation, Philadelphia, 1928, pages 692 and 693.

"Combustion Engineering," The Riverside Press, Cambridge, Mass., 1947, pages 21.8–21.11.